United States Patent
Williams et al.

(10) Patent No.: US 11,543,024 B1
(45) Date of Patent: Jan. 3, 2023

(54) METHODS AND SYSTEMS FOR CONTROLLING TRANSMISSION IN NEUTRAL

(71) Applicant: GM GLOBAL TECHNOLOGY OPERATIONS LLC, Detroit, MI (US)

(72) Inventors: Bryan John Williams, Woodway, TX (US); Greg Perantoni, Fenton, MI (US); Matthew Pruski, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/654,183

(22) Filed: Mar. 9, 2022

(51) Int. Cl.
| | | |
|---|---|---|
| F16H 61/02 | (2006.01) | |
| F16H 59/42 | (2006.01) | |
| F16H 59/72 | (2006.01) | |
| F16H 61/12 | (2010.01) | |
| F16H 59/44 | (2006.01) | |
| F16H 59/70 | (2006.01) | |

(52) U.S. Cl.
CPC ......... *F16H 61/0213* (2013.01); *F16H 59/42* (2013.01); *F16H 59/44* (2013.01); *F16H 59/70* (2013.01); *F16H 59/72* (2013.01); *F16H 61/12* (2013.01); *F16H 2061/1284* (2013.01); *F16H 2200/006* (2013.01)

(58) Field of Classification Search
CPC .......... F16H 59/42; F16H 59/44; F16H 59/70; F16H 59/72; F16H 61/0213; F16H 61/12; F16H 2061/1284; F16H 2200/006
See application file for complete search history.

(56) References Cited

U.S. PATENT DOCUMENTS

| | | | | |
|---|---|---|---|---|
| 5,469,754 A | * | 11/1995 | Sakai | F16H 61/061 74/336 R |
| 5,944,632 A | * | 8/1999 | Hara | F16H 61/0031 477/158 |
| 2010/0121542 A1 | * | 5/2010 | Tsukamoto | F16H 61/20 701/51 |
| 2019/0136970 A1 | * | 5/2019 | Takahashi | F02D 29/02 |

* cited by examiner

*Primary Examiner* — Edwin A Young
(74) *Attorney, Agent, or Firm* — Lorenz & Kopf LLP

(57) ABSTRACT

Systems and methods are provided for controlling a transmission associated with a vehicle. The method includes receiving a neutral range selection for the transmission, and receiving a temperature and a pressure of a lubricant associated with the transmission. The method includes receiving a speed of an input shaft associated with the transmission, and determining, by a processor, based on the temperature and the speed of the input shaft, a pressure threshold value for the lubricant. The method includes outputting, by the processor, one or more control signals to command the transmission to a one clutch neutral state in which one clutch of a plurality of clutches associated with the transmission is engaged based on a comparison of the pressure threshold value to the pressure of the lubricant.

19 Claims, 4 Drawing Sheets

METHODS AND SYSTEMS FOR CONTROLLING TRANSMISSION IN NEUTRAL

INTRODUCTION

The technical field generally relates to methods and systems for controlling a transmission of a vehicle, and more particularly relates to methods and systems for controlling a transmission of a vehicle when a neutral range is selected.

Generally, a transmission transmits power from the engine to the vehicle wheels. In the example of an automatic transmission, the transmission is responsive to a range selected by an operator to control the supply of power to the vehicle wheels. For example, an operator may select a neutral range, in which it is desired that power is not supplied to the vehicle wheels. In certain instances, it may also be desired that in the neutral range the vehicle remains stationary on flat ground.

Accordingly, it is desirable to provide methods and systems for controlling a transmission of a vehicle when a neutral range is selected that inhibits an inadvertent movement of the vehicle on flat ground. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a method for controlling a transmission associated with a vehicle. The method includes receiving a neutral range selection for the transmission, and receiving a temperature and a pressure of a lubricant associated with the transmission. The method includes receiving a speed of an input shaft associated with the transmission, and determining, by a processor, based on the temperature and the speed of the input shaft, a pressure threshold value for the lubricant. The method includes outputting, by the processor, one or more control signals to command the transmission to a one clutch neutral state in which one clutch of a plurality of clutches associated with the transmission is engaged based on a comparison of the pressure threshold value to the pressure of the lubricant.

The outputting, by the processor, the one or more control signals to command the transmission to the one clutch neutral state includes determining, by the processor, the pressure of the lubricant is greater than the pressure threshold value. The method includes outputting, by the processor, one or more control signals to command the transmission to maintain a two clutch neutral state in which two clutches of the plurality of clutches associated with the transmission are engaged based on the comparison of the pressure threshold value to the pressure of the lubricant. The method includes receiving the pressure of the lubricant and lubricant pressure sensor self-diagnostics that indicate a fault state from a lubricant pressure sensor associated with the transmission, and outputting, by the processor, the one or more control signals to command the transmission to the one clutch neutral state based on the lubricant pressure sensor in the fault state. The method includes receiving a position of a brake pedal associated with the vehicle, and determining, by the processor, whether the brake pedal is depressed prior to the determining the pressure threshold value for the lubricant. The method includes receiving a speed of the vehicle, and determining, by the processor, whether the speed of the vehicle exceeds a speed threshold prior to the determining the pressure threshold value for the lubricant. The method includes receiving the temperature of the lubricant and lubricant temperature sensor self-diagnostics that indicate a fault state from a lubricant temperature sensor associated with the transmission, and setting a default temperature for the temperature of the lubricant based on the lubricant temperature sensor in the fault state.

Also provided is a transmission control system for a transmission associated with a vehicle. The transmission control system includes a human-machine interface configured to provide a range selection, and a lubricant pressure sensor configured to observe a pressure of a lubricant associated with the transmission. The transmission control system includes a lubricant temperature sensor configured to observe a temperature of the lubricant associated with the transmission, and an input shaft speed sensor configured to observe a speed of an input shaft associated with the transmission. The transmission control system includes a controller, having a processor configured to: determine, based on the range selection, a selection of a neutral range for the transmission; determine, based on the selection of the neutral range, a pressure threshold value for the lubricant based on the temperature of the lubricant and the speed of the input shaft; and output one or more control signals to command the transmission to a one clutch neutral state in which one clutch of a plurality of clutches associated with the transmission is engaged based on a comparison of the pressure threshold value to the pressure of the lubricant.

The processor of the transmission control system is configured to output the one or more control signals to command the transmission to the one clutch neutral state based on the pressure of the lubricant being greater than the pressure threshold value. The processor of the transmission control system is configured to output one or more control signals to command the transmission to maintain a two clutch neutral state in which two clutches of the plurality of clutches associated with the transmission are engaged based on the comparison of the pressure threshold value to the pressure of the lubricant. The lubricant pressure sensor is configured to provide lubricant pressure sensor self-diagnostics that indicate a fault state, and the processor is configured to output the one or more control signals to command the transmission to the one clutch neutral state based on the lubricant pressure sensor in the fault state. The transmission control system includes a brake pedal position sensor configured to observe a position of a brake pedal associated with the vehicle, and the processor is configured to determine whether the brake pedal is depressed prior to the determination of the pressure threshold value for the lubricant. The transmission control system includes a vehicle speed sensor configured to observe a speed of the vehicle and the processor is configured to determine whether the speed of the vehicle exceeds a speed threshold prior to the determination of the pressure threshold value for the lubricant. The lubricant temperature sensor is configured to provide lubricant temperature sensor self-diagnostics that indicate a fault state of the lubricant temperature sensor, and the processor is configured to set a default temperature for the temperature of the lubricant based on the lubricant temperature sensor in the fault state.

Further provided is a vehicle that includes an eight speed transmission having an input shaft and a plurality of clutches. The eight speed transmission is configured such that a range selection requires engagement of three clutches of the plurality of clutches. The vehicle includes a sensor system including a lubricant pressure sensor configured to observe a pressure of a lubricant associated with the eight speed transmission, a lubricant temperature sensor configured to observe a temperature of the lubricant and an input shaft speed sensor configured to observe a speed of the input shaft. The vehicle includes a controller, having a processor configured to: determine a selection of a neutral range for the eight speed transmission; determine, based on the selection of the neutral range, a pressure threshold value for the lubricant based on the temperature of the lubricant and the speed of the input shaft; output one or more control signals to command the eight speed transmission to a one clutch neutral state in which one clutch of the plurality of clutches is engaged based on the pressure of the lubricant being greater than the pressure threshold value; and output one or more control signals to command the eight speed transmission to maintain a two clutch neutral state in which two clutches of the plurality of clutches are engaged based on the pressure of the lubricant being less than the pressure threshold value.

The lubricant pressure sensor is configured to provide lubricant pressure sensor self-diagnostics that indicate a fault state, and the processor is configured to output the one or more control signals to command the eight speed transmission to the one clutch neutral state based on the lubricant pressure sensor in the fault state. The vehicle includes a brake pedal position sensor configured to observe a position of a brake pedal associated with the vehicle, and the processor is configured to determine whether the brake pedal is depressed prior to the determination of the pressure threshold value for the lubricant. The vehicle includes a vehicle speed sensor configured to observe a speed of the vehicle and the processor is configured to determine whether the speed of the vehicle exceeds a speed threshold prior to the determination of the pressure threshold value for the lubricant. The lubricant temperature sensor is configured to provide lubricant temperature sensor self-diagnostics that indicate a fault state of the lubricant temperature sensor, and the processor is configured to set a default temperature for the temperature of the lubricant based on the lubricant temperature sensor in the fault state.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
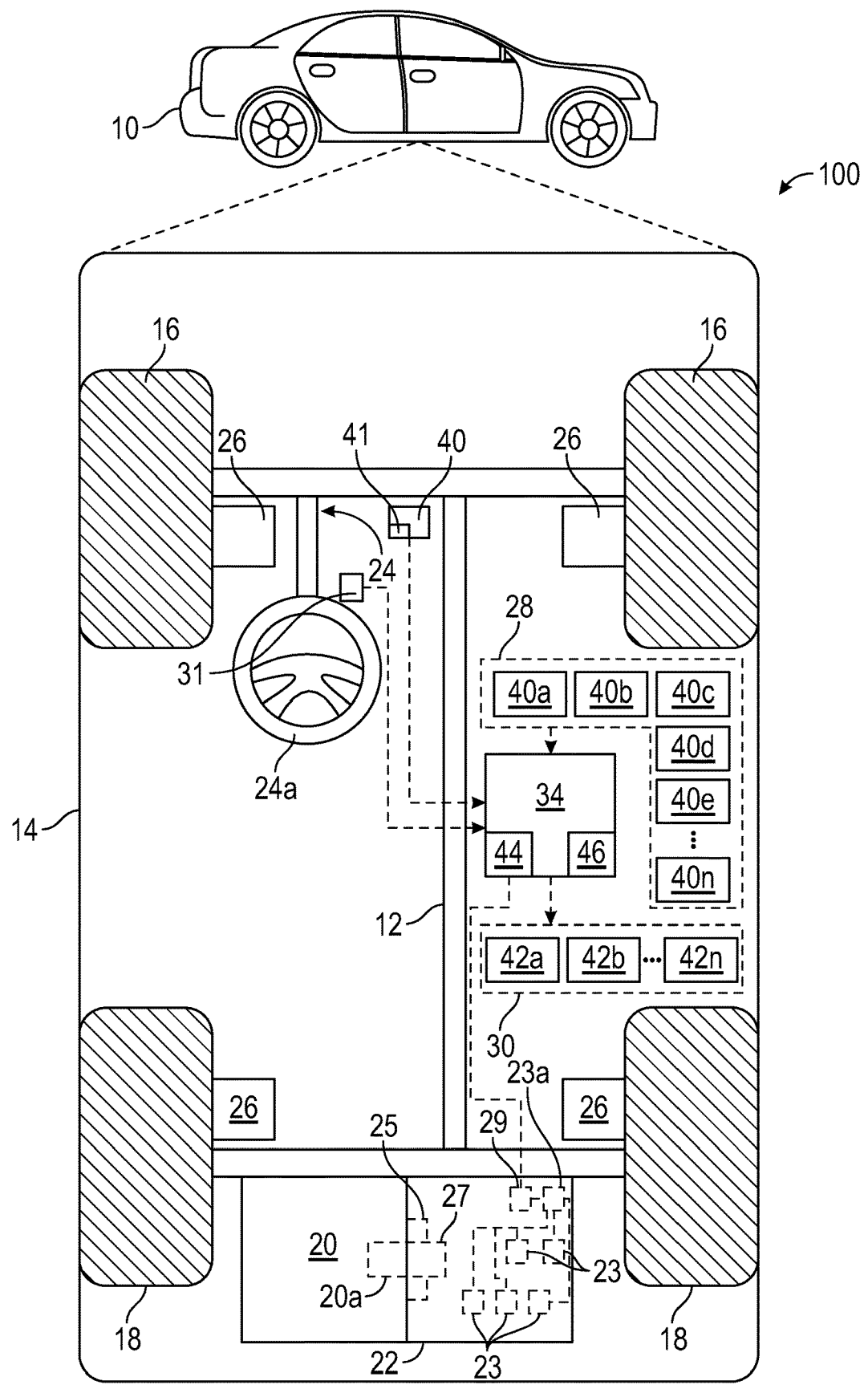
FIG. 1 is a functional block diagram illustrating a vehicle including a transmission neutral state control system in accordance with various embodiments.

With reference to FIG. 1, a transmission control system or transmission neutral state control system shown generally as 100 is associated with a vehicle 10 in accordance with various embodiments. In general, the transmission neutral state control system 100 generates one or more control signals to a transmission or transmission system 22 of the vehicle 10 to command one or more clutches 23 to disengage when a neutral range is selected. In various embodiments, the transmission neutral state control system 100 generates the control signals based on information obtained from a sensor system 28 of the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14.

In various embodiments, the vehicle 10 is an autonomous vehicle or a semi-autonomous vehicle. As can be appreciated, the transmission neutral state control system 100 can be implemented in other non-autonomous systems and is not limited to the present embodiments. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, the transmission system 22, a steering system 24, a brake system 26, the sensor system 28, an actuator system 30 and at least one controller 34. The vehicle 10 may also include a human-machine interface 40. The propulsion system 20 may, in various embodiments, include an internal combustion engine, an electric machine such as a traction motor, and/or a fuel cell propulsion system. The propulsion system 20 generally has an output shaft or crankshaft 20a, which is coupled to the transmission system 22.

The transmission system 22 is configured to transmit power from the propulsion system 20 to the vehicle wheels 18 based on a range selection received from the human-machine interface 40. The transmission system 22 includes a torque converter 25, which is coupled to the crankshaft 20a of the propulsion system 20. The torque converter 25 enables the propulsion system 20 to move independently of the transmission system 22, and uses torque received from the crankshaft 20a to drive an input shaft 27 of the transmission system 22. The transmission system 22 includes various gears, planetary gear sets, and the clutches 23. The clutches 23 are hydraulically operated and are in fluid communication with a pressurized hydraulic fluid source. The clutches 23 are coupled to the hydraulic fluid source via control valves 23a, which regulate the engagement or disengagement of the respective clutch 23 by supplying pressure to the respective clutch 23 engage the respective clutch 23 or discharging pressure from the respective clutch 23 to disengage the respective clutch 23. The control valves 23a are responsive to control signals received from a transmission controller 29 to supply or discharge the pressure to/from the respective clutch 23. The clutches 23 are also lubricated by a lubricant (lube) contained within a transmission case. The transmission case encloses the components of the transmission system 22.

The transmission controller 29 includes at least one processor and a computer-readable storage device or media. The processor may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the transmission controller 29, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the transmission controller 29 in controlling the transmission system 22.

In this example, the transmission system 22 includes five clutches 23, which cooperate to enable a range selection. In this regard, the three of the five clutches 23 are selectively engaged in order to provide one or more reverse drive ratios and one or more forward drive ratios. In this example, the transmission system 22 is an eight speed rear wheel drive transmission, which includes eight forward drive gear ratios. Generally, when a neutral range is selected via the human-machine interface 40, the transmission system 22 defaults to two of the clutches 23 being engaged or a two clutch neutral state, with one clutch 23 disengaged. This enables a subsequent range selection, such as the drive range or the reverse range, to occur smoothly, as the shifting to the subsequent range requires the engagement of a single clutch 23. In certain instances, maintaining the two clutch neutral state may result in an inadvertent movement or creep of the vehicle 10 on flat ground. The transmission neutral state control system 100 overrides the two clutch neutral state and commands the transmission system 22 to a one clutch neutral state, or state in which two of the clutches 23 are disengaged with a single clutch engaged 23. This reduces the likelihood of the vehicle 10 inadvertently moving or creeping on flat ground while the neutral range is selected and requires the engagement of two clutches 23 to shift into a subsequent range like the drive range, the reverse range, etc. Thus, generally, a one clutch neutral state is a state of the transmission system 22 in the neutral range in which one clutch 23 is engaged such that two clutches 23 are required to be engaged for a subsequent range selection. The two clutch neutral state is a state of the transmission system 22 in the neutral range in which two clutches 23 are engaged such that a single clutch 23 is required to be engaged for a subsequent range selection.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems. In one example, the vehicle 10 includes a brake pedal 31, which is movable by the operator from a released position into a depressed position to activate the brake system 26 to apply the braking torque.

The steering system 24 influences a position of the vehicle wheels 16 and/or 18. While depicted as including a steering wheel 24a for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. In various embodiments, the sensing devices 40a-40n include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. The sensor system 28 is in communication with the controller 34 over a communication medium. The sensor system 28 provides information for controlling the transmission system 22 when a neutral range is selected by an operator.

In one example, the sensor system 28 includes a vehicle speed sensor 40a, which observes a speed of the vehicle 10 and outputs the speed of the vehicle 10 to the controller 34. The vehicle speed sensor 40a also includes vehicle speed sensor self-diagnostics, which output data to the controller 34 regarding whether the vehicle speed sensor 40a is in a fault state such that a reading or observation of the vehicle speed sensor 40a is inaccurate. The sensor system 28 also includes a brake pedal position sensor 40b, which observes a position of the brake pedal 31 associated with the vehicle 10 and outputs the position of the brake pedal 31 to the controller 34. The brake pedal position sensor 40b also includes brake pedal position sensor self-diagnostics, which output data to the controller 34 regarding whether the brake pedal position sensor 40b is in a fault state such that a reading or observation of the brake pedal position sensor 40*b* is inaccurate. The sensor system 28 includes a lubricant or lube temperature sensor 40*c*, which observes a temperature of the lubricant within the transmission system 22 and outputs the temperature of the lube in the transmission system 22 to the controller 34. The lube temperature sensor 40*c* also includes lube temperature sensor self-diagnostics, which output data to the controller 34 regarding whether the lube temperature sensor 40*c* is in a fault state such that a reading or observation of the lube temperature sensor is inaccurate. The sensor system 28 includes a lubricant or lube pressure sensor 40*d*, which observes a pressure of the lubricant within the transmission system 22 and outputs the pressure of the lubricant in the transmission system 22 to the controller 34. The lube pressure sensor 40*d* also includes lube pressure sensor self-diagnostics, which output data to the controller 34 regarding whether the lube pressure sensor 40*d* is in a fault state such that a reading or observation of the lube pressure sensor 40*d* is inaccurate. It should be noted that while a lube pressure sensor 40*d* is used herein, the lubricant pressure may also be determined from a lubricant line pressure sensor, for example. The sensor system 28 also includes an input shaft speed sensor 40*e*, which observes a speed of the input shaft 27 of the transmission system 22 and outputs the observed speed of the input shaft 27 to the controller 34.

The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components (such as those used in connection with the human-machine interface 40), active safety seat or haptic seat, and the like.

The human-machine interface 40 is in communication with the controller 34 via a suitable communication medium, such as a bus. The human-machine interface 40 may be configured in a variety of ways. In some embodiments, the human-machine interface 40 may include various switches, levers, or buttons, such as a range selector 41, a touchscreen interface that may be overlaid on the display, a keyboard, an audible device, a microphone associated with a speech recognition system, or various other human-machine interface devices. The range selector 41 comprises any user input device that enables an operator to input an operating range for the transmission system 22, such as park, reverse, neutral, drive and low, including, but not limited to, switches, buttons, levers, etc. Those skilled in the art may realize other techniques to implement the range selector 41 in the vehicle 10. The range selector 41 is in communication with the controller 34 over a communication medium, and provides the input range selection to the controller 34.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. In various embodiments, controller 34 is configured to implement instructions of the transmission neutral state control system 100 as discussed in detail below.

In various embodiments, the instructions, when executed by the processor, receive and process sensor data from the sensor system 28 and range selection data from the range selector 41 to determine whether to command the one clutch neutral state to the transmission controller 29 of the transmission system 22. The controller 34 is in communication with the transmission controller 29 over a communication medium, including, but not limited to a bus. It should be noted that while the controller 34 is described and illustrated herein as being separate from the transmission controller 29, it should be noted that in other embodiments, the transmission neutral state control system 100 may be implemented by the transmission controller 29.

Figure 2:
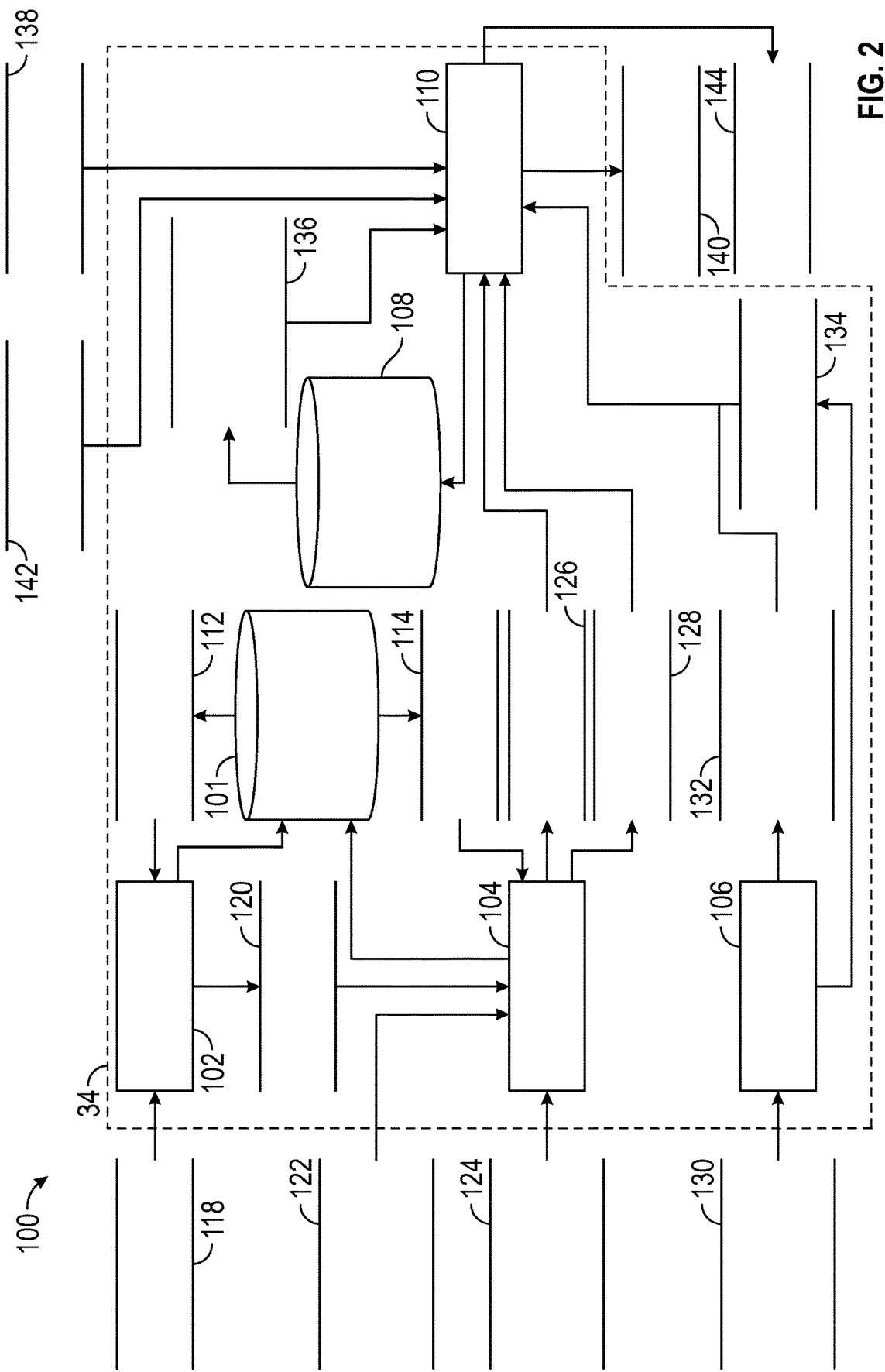
FIG. 2 is a dataflow diagram illustrating the transmission neutral state control system of the vehicle of FIG. 1 in accordance with various embodiments.

For example, as shown in more detail with regard to FIG. 2 and with continued reference to FIG. 1, a dataflow diagram illustrates various embodiments of the transmission neutral state control system 100, which may be embedded within the controller 34. Various embodiments of the transmission neutral state control system 100 according to the present disclosure can include any number of sub-modules embedded within the controller 34. As can be appreciated, the sub-modules shown in FIG. 2 can be combined and/or further partitioned to similarly determine whether to command the one clutch neutral state to control the transmission system 22 in a neutral range selection. Inputs to the transmission neutral state control system 100 may be received from the sensor system 28 (FIG. 1), the range selector 41 (FIG. 1), received from other control modules (not shown) associated with the vehicle 10, and/or determined/modeled by other sub-modules (not shown) within the controller 34. In various embodiments, the transmission neutral state control system 100 includes a threshold datastore 101, a range selection monitor module 102, a vehicle status monitor module 104, a temperature monitor module 106, a lubricant or lube pressure datastore 108 and a neutral state control module 110.

The threshold datastore 101 stores data of thresholds associated with the transmission neutral state control system 100. In this example, the threshold datastore 101 stores a time threshold value 112 and a speed threshold value 114. The time threshold value 112 and a speed threshold value 114 are each predefined, default or factory set values. The time threshold value 112 is a threshold for a period of time between range selection input received through the range selector 41. In one example, the time threshold value 112 is about 1.5 seconds to about 2.0 seconds. The speed threshold value 114 is a threshold for a speed of the vehicle 10. In one example, the speed threshold value 114 is about 20 kilometers per hour.

The range selection monitor module 102 receives as input range data 118 from the range selector 41 of the human-machine interface 40. The range data 118 is a range selected by the operator with the range selector 41, including, but not limited to park, reverse, neutral, drive and low. The range selection monitor module 102 determines whether the neutral range has been selected based on the range data 118. Based on the receipt of a neutral range selection, the range selection monitor module 102 starts a timer. The range selection monitor module 102 determines whether a new range has been selected based on the range data 118. If the range data 118 has changed, such that the neutral range is no longer selected, the range selection monitor module 102 resets the timer to zero. If the selected range based on the range data 118 remains the neutral range such that the range data 118 is unchanged (or no new range selection input has been received to the range selector 41), the range selection monitor module 102 queries the threshold datastore 101 and retrieves the time threshold value 112. The range selection monitor module 102 determines whether a time value of the timer is greater than the time threshold value 112. This ensures that the range selection input received to the range selector 41 is not accidental. If the time value of the timer is greater than the time threshold value 112, the range selection monitor module 102 sets neutral range selection data 120 for the vehicle status monitor module 104. The neutral range selection data 120 indicates that the neutral range has been received as input to the range selector 41.

The vehicle status monitor module 104 receives as input the neutral range selection data 120. Based on the neutral range selection data 120, the vehicle status monitor module 104 receives as input brake pedal data 122 and vehicle speed data 124. The brake pedal data 122 is data from the brake pedal position sensor 40b of the sensor system 28 that indicates the position of the brake pedal 31. The brake pedal data 122 also includes the brake pedal position sensor self-diagnostic data that indicates whether the brake pedal position sensor 40b is in a fault state such that readings or observations of the brake pedal position sensor 40b are inaccurate. If the brake pedal position sensor 40b is in a fault state, the vehicle status monitor module 104 bypasses determining the position of the brake pedal 31. If the brake pedal position sensor is not in a fault state, the vehicle status monitor module 104 determines whether the position of the brake pedal 31 is depressed or released based on the brake pedal data 122. For example, the vehicle status monitor module 104 determines whether the brake pedal 31 is depressed such that braking torque is being applied to the vehicle wheels 16, 18 or whether the brake pedal 31 is released such that braking torque is not being applied. The vehicle status monitor module 104 sets vehicle brake status data 126 for the neutral state control module 110 that indicates the position of the brake pedal 31. In this example, the vehicle brake status data 126 indicates whether the brake pedal 31 is depressed such that braking torque is being applied or whether the brake pedal 31 is released such that braking torque is not being applied to the vehicle wheels 16, 18.

The vehicle speed data 124 is data from the vehicle speed sensor 40a of the sensor system 28 that indicates the speed of the vehicle 10. The vehicle speed data 124 also includes the vehicle speed sensor self-diagnostic data that indicates whether the vehicle speed sensor 40a is in a fault state such that readings or observations of the vehicle speed sensor 40a are inaccurate. If the vehicle speed sensor 40a is in a fault state, the vehicle status monitor module 104 bypasses analyzing the speed of the vehicle 10. If the vehicle speed sensor is not in a fault state, the vehicle status monitor module 104 retrieves the speed threshold value 114 from the threshold datastore 101. The vehicle status monitor module 104 determines whether the speed of the vehicle 10 is less than the speed threshold value 114. If the speed of the vehicle 10 is less than the speed threshold value 114, the vehicle status monitor module 104 sets vehicle speed status data 128 for the neutral state control module 110. The vehicle speed status data 128 is data that indicates that the speed of the vehicle 10 is below the speed threshold.

The temperature monitor module 106 receives as input lubricant or lube temperature data 130 from the lube temperature sensor 40c of the sensor system 28. The lube temperature data 130 indicates the temperature of the lubricant associated with the transmission system 22. The lube temperature data 130 also includes the lube temperature sensor self-diagnostic data from the lube temperature sensor 40c that indicates whether the lube temperature sensor 40c is in a fault state such that readings or observations of the lube temperature sensor 40c are inaccurate. If the lube temperature sensor 40c is in a fault state, the vehicle status monitor module 104 sets default temperature data 132 for the neutral state control module 110. In one example, the default temperature data 132 is a default value for the lube temperature and is about 80 degrees Celsius. The default value for the lubricant temperature is stored in a memory associated with the temperature monitor module 106 and is a predefined, factory-set value. If the lube temperature sensor 40c is not in a fault state, the vehicle status monitor module 104 sets temperature data 134 for the neutral state control module 110 that indicates the temperature of the lubricant associated with the transmission system 22 based on the temperature observed by the lube temperature sensor 40c.

The lube pressure datastore 108 stores a correlation table that correlates the temperature of the lubricant associated with the transmission system 22 with a speed of the input shaft 27 of the transmission system 22 to a threshold value for a pressure of the lubricant associated with the transmission system 22. Thus, the lube pressure datastore 108 stores one or more lookup tables, which provide a pressure threshold value or lube pressure threshold value 136 that corresponds with the temperature of the lubricant and the speed of the input shaft 27. In one example, the lube pressure threshold values 136 stored in the lube pressure datastore 108 are each pre-defined factory-set values.

The neutral state control module 110 receives as input the vehicle brake status data 126 from the vehicle status monitor module 104. If the vehicle brake status data 126 indicates that the brake pedal 31 is not depressed, such that braking torque is not being applied to the vehicle wheels 16, 18, the neutral state control module 110 receives as input the vehicle speed status data 128 if the vehicle 10 is below the speed threshold. Based on the receipt of the vehicle speed status data 128, the neutral state control module 110 receives as input lubricant or lube pressure sensor data 138 from the lube pressure sensor 40d. The lube pressure sensor data 138 indicates the pressure of the lubricant associated with the transmission system 22. The lube pressure sensor data 138 also includes self-diagnostic data from the lube pressure sensor 40d that indicates whether the lube pressure sensor 40d is in a fault state such that readings or observations of the lube pressure sensor 40d are inaccurate. If the lube pressure sensor 40d is in a fault state, the neutral state control module 110 outputs override data 140. The override data 140 is one or more control signals to command the transmission system 22 to enter the one clutch neutral state, in which one of the clutches 23 (FIG. 1) is disengaged such that a single clutch 23 is used with the neutral range.

If the lube pressure sensor 40d is not in a fault state, the neutral state control module 110 receives input shaft speed data 142. The input shaft speed data 142 is data from the input shaft speed sensor 40e of the sensor system 28 that indicates the speed of the input shaft 27 associated with the transmission system 22. The neutral state control module 110 receives as input the default temperature data 132 or the temperature data 134. Based on the input shaft speed data 142 and the temperature of the lubricant associated with the transmission system 22 (either the default temperature data 132 or the temperature data 134), the neutral state control module 110 queries the lube pressure datastore 108 and retrieves the lube pressure threshold value 136 that corresponds with the speed of the input shaft 27 and the temperature of the lubricant. The neutral state control module 110 compares the lube pressure threshold value 136 to the lube pressure sensor data 138. If the pressure of the lubricant in the lube pressure sensor data 138 is greater than the lube pressure threshold value 136, the neutral state control module 110 outputs the override data 140. If the pressure of the lubricant in the lube pressure sensor data 138 is less than the lube pressure threshold value 136, the neutral state control module 110 outputs the default state data 144. The default state data 144 is one or more control signals to command the transmission system 22 to the two clutch neutral state, in which two of the clutches 23 (FIG. 1) are used with the neutral range. If the pressure of the lubricant in the lube pressure sensor data 138 is equal to the lube pressure threshold value 136, the neutral state control module 110 outputs the override data 140. In one example, the controller 34 outputs the one or more control signals to the transmission controller 29 to command the transmission system 22 into the one clutch neutral state based on the override data 140 or the two clutch neutral state based on the default state data 144.

Figure 3A:
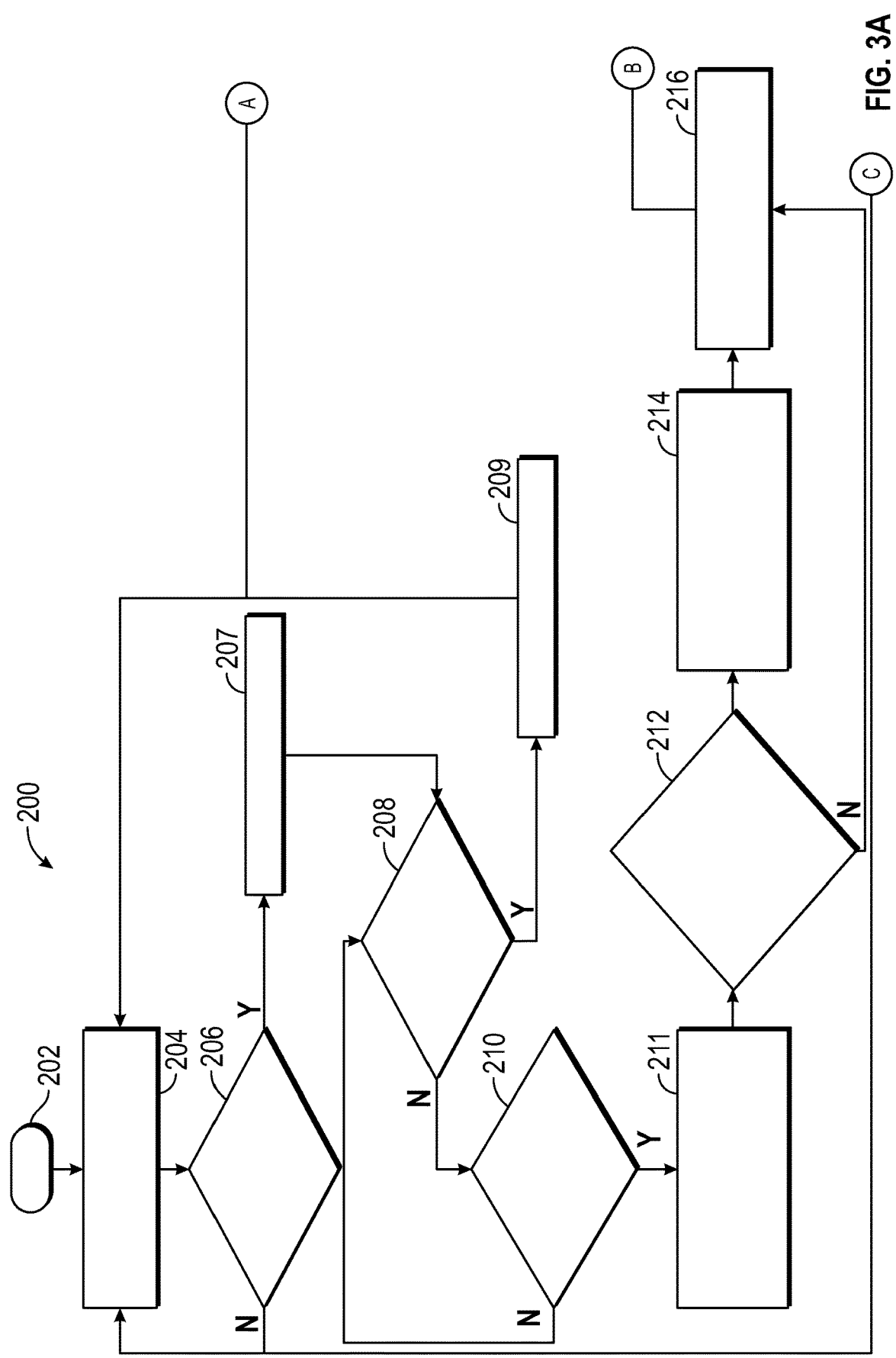
FIGS. 3A and 3B are a flowchart illustrating a control method performed by the transmission neutral state control system of the vehicle of FIG. 1 in accordance with various embodiments.
Figure 3B:
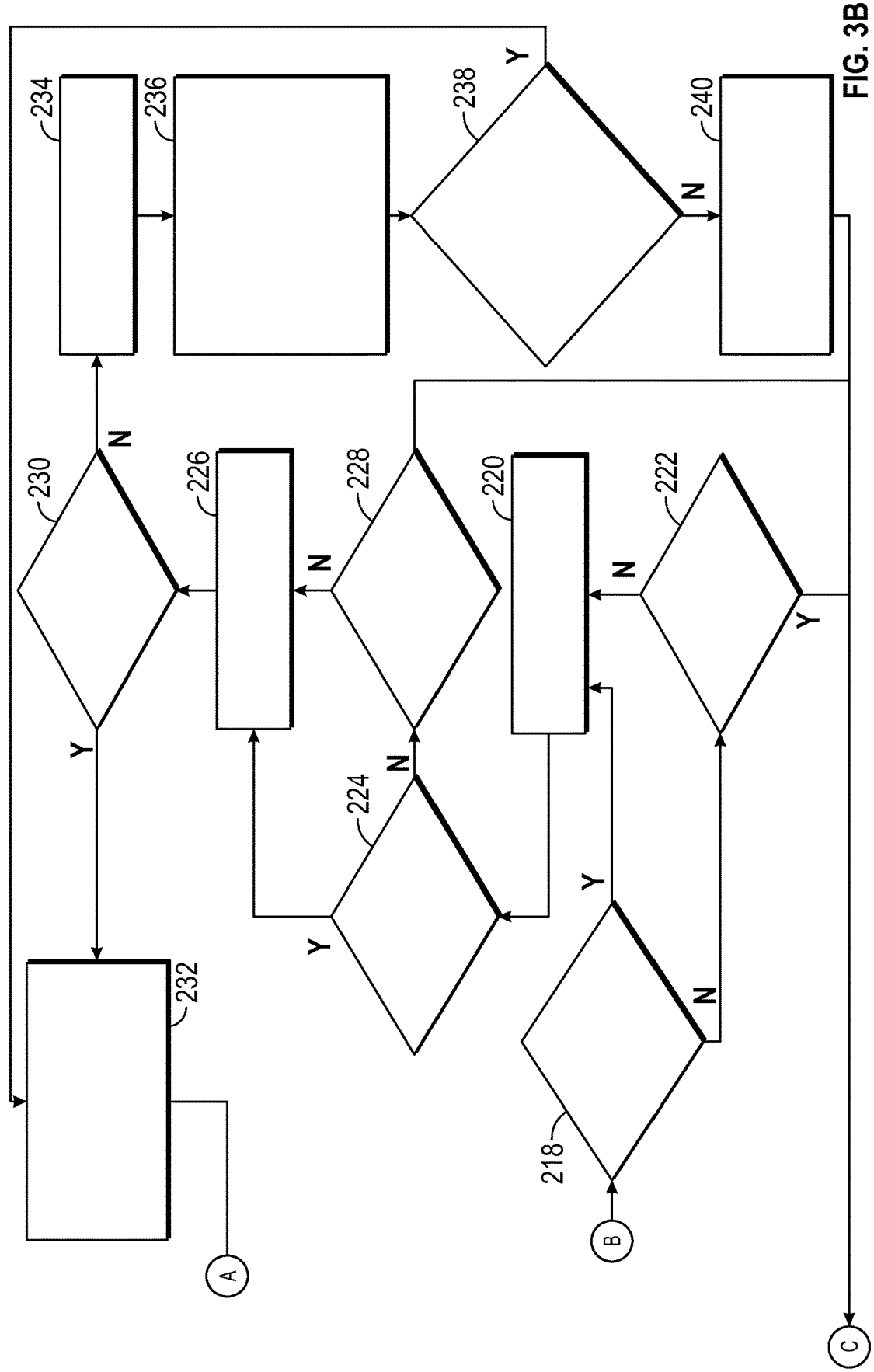

Referring now to FIGS. 3A and 3B, and with continued reference to FIGS. 1 and 2, a flowchart illustrates a control method 200 that can be performed by the transmission neutral state control system 100 of FIG. 1 in accordance with the present disclosure. In one example, the control method 200 is performed by the processor 44 of the controller 34. As can be appreciated in light of the disclosure, the order of operation within the method is not limited to the sequential execution as illustrated in FIGS. 3A and 3B, but may be performed in one or more varying orders as applicable and in accordance with the present disclosure. In various embodiments, the method 200 runs continuously during operation of the vehicle 10.

The method begins at 202. At 204, the method receives the range selection or range data 118 from the range selector 41. At 206, the method determines whether the neutral range has been selected via the range selector 41. If false, the method loops to 204. Otherwise, if true, the method proceeds to 207. At 207, the method starts a timer. At 208, the method determines, based on the range data 118, whether the range selection has changed such that the range selection is no longer the neutral range. If true, the method proceeds to 209. At 209, the method resets the timer equal to zero and loops to 204.

Otherwise, if the range selection has not changed such that the neutral range is still selected, at 210, the method determines whether the time elapsed since the range selection was input to the range selector 41 is greater than the time threshold value 112 retrieved from the threshold datastore 101 based on the time of the timer. If true, the method proceeds to 210. Otherwise, the method loops to 208.

At 211, the method receives as input the lube temperature data 130 from the lube temperature sensor 40c of the sensor system 28 (FIG. 1). At 212, the method determines whether the lube temperature sensor 40c is in a fault state based on the lube temperature data 130. If true, the method proceeds to 214. At 214, the method sets the lube temperature to the default temperature or sets default temperature data 132.

Otherwise, if the lube temperature sensor 40c is not in the fault state, the method proceeds to 216. At 216, the method receives the brake pedal data 122 from the brake pedal position sensor 40b of the sensor system 28. At 218, the method determines whether the brake pedal position sensor 40b is in a fault state based on the brake pedal data 122. If true, the method proceeds to 220. If false, the method determines at 222 whether the brake pedal 31 is depressed based on the brake pedal data 122. If the brake pedal 31 is depressed such that braking torque is being applied to the vehicle wheels 16, 18, the method loops to 204. Otherwise, the method proceeds to 220.

At 220, the method receives as input the vehicle speed data 124. At 224, the method determines whether the vehicle speed sensor 40a is in a fault state based on the vehicle speed data 124. If true, the method proceeds to 226. If false, the method determines at 228 whether the speed of the vehicle 10 is greater than the speed threshold value 114 retrieved from the threshold datastore 101. If true, the method loops to 204. Otherwise, the method proceeds to 226.

At 226, the method receives as input the lube pressure sensor data 138. At 230, the method determines whether the lube pressure sensor 40d is in a fault state based on the lube pressure sensor data 138. If true, the method proceeds to 232. At 232, the method outputs the override data to the transmission system 22 to command the one clutch neutral state by disengaging one of the clutches 23 such that a single clutch 23 is engaged in the neutral range. The method proceeds to 204.

If the lube pressure sensor 40d is not in a fault state based on the lube pressure sensor data 138, at 234, the method receives as input the input shaft speed data 142 from the input shaft speed sensor of the sensor system 28. At 236, the method queries the lube pressure datastore 108 and retrieves the lube pressure threshold value 136 based on the input shaft speed and the lubricant temperature. At 238, the method determines whether the value of the lubricant pressure from the lube pressure sensor data 138 is greater than the lube pressure threshold value 136. If true, the method loops to 232. Otherwise, at 240, the method outputs the default state data 144 to command the transmission system 22 to the two-clutch neutral state, in which two of the clutches 23 are engaged in the neutral range. The method loops to 204.

Thus, as discussed, the transmission neutral state control system 100 controls the transmission system 22 to enter the one clutch neutral state to reduce inadvertent movement or creeping of the vehicle 10 in the neutral range on flat ground. In addition, the transmission neutral state control system 100 controls the transmission system 22 to maintain the two clutch neutral state to improve shift quality out of the neutral range. By evaluating the vehicle speed, the transmission neutral state control system 100 also enables the transmission system 22 to maintain the two clutch neutral state to maintain shift quality in situations where the vehicle 10 is purposefully moving, such as coasting down a hill or shifting into neutral while vehicle 10 is already rolling. Further, by evaluating the brake pedal position, the transmission neutral state control system 100 enables the transmission system 22 to maintain the two clutch neutral state to maintain shift quality in instances where the operator is depressing the brake pedal to hold the position of the vehicle 10. In addition, it should be noted that while the transmission neutral state control system 100 and the control method 200 are described as being employed with the transmission system 22 that comprises the eight speed rear wheel drive transmission, the transmission neutral state control system 100 and the control method 200 may be employed with a nine speed or ten speed transmission. Further, the transmission neutral state control system 100 and the control method 200 may be employed with a front wheel drive transmission system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a transmission associated with a vehicle, comprising:
receiving a neutral range selection for the transmission;
receiving a temperature and a pressure of a lubricant associated with the transmission;
receiving a speed of an input shaft associated with the transmission;
determining, by a processor, based on the temperature and the speed of the input shaft, a pressure threshold value for the lubricant; and
outputting, by the processor, one or more control signals to command the transmission to a one clutch neutral state in which one clutch of a plurality of clutches associated with the transmission is engaged based on a comparison of the pressure threshold value to the pressure of the lubricant.

2. The method of claim 1, wherein the outputting, by the processor, the one or more control signals to command the transmission to the one clutch neutral state further comprises determining, by the processor, the pressure of the lubricant is greater than the pressure threshold value.

3. The method of claim 1, further comprising outputting, by the processor, one or more control signals to command the transmission to maintain a two clutch neutral state in which two clutches of the plurality of clutches associated with the transmission are engaged based on the comparison of the pressure threshold value to the pressure of the lubricant.

4. The method of claim 1, further comprising:
receiving the pressure of the lubricant and lubricant pressure sensor self-diagnostics that indicate a fault state from a lubricant pressure sensor associated with the transmission, and outputting, by the processor, the one or more control signals to command the transmission to the one clutch neutral state based on the lubricant pressure sensor in the fault state.

5. The method of claim 1, further comprising:
receiving a position of a brake pedal associated with the vehicle; and
determining, by the processor, whether the brake pedal is depressed prior to the determining the pressure threshold value for the lubricant.

6. The method of claim 1, further comprising:
receiving a speed of the vehicle; and
determining, by the processor, whether the speed of the vehicle exceeds a speed threshold prior to the determining the pressure threshold value for the lubricant.

7. The method of claim 1, further comprising:
receiving the temperature of the lubricant and lubricant temperature sensor self-diagnostics that indicate a fault state from a lubricant temperature sensor associated with the transmission, and setting a default temperature for the temperature of the lubricant based on the lubricant temperature sensor in the fault state.

8. A transmission control system for a transmission associated with a vehicle, comprising:
a human-machine interface configured to provide a range selection;
a lubricant pressure sensor configured to observe a pressure of a lubricant associated with the transmission;
a lubricant temperature sensor configured to observe a temperature of the lubricant associated with the transmission;
an input shaft speed sensor configured to observe a speed of an input shaft associated with the transmission; and
a controller, having a processor configured to:
determine, based on the range selection, a selection of a neutral range for the transmission;
determine, based on the selection of the neutral range, a pressure threshold value for the lubricant based on the temperature of the lubricant and the speed of the input shaft; and
output one or more control signals to command the transmission to a one clutch neutral state in which one clutch of a plurality of clutches associated with the transmission is engaged based on a comparison of the pressure threshold value to the pressure of the lubricant.

9. The transmission control system of claim 8, wherein the processor is configured to output the one or more control signals to command the transmission to the one clutch neutral state based on the pressure of the lubricant being greater than the pressure threshold value.

10. The transmission control system of claim 8, wherein the processor is configured to output one or more control signals to command the transmission to maintain a two clutch neutral state in which two clutches of the plurality of clutches associated with the transmission are engaged based on the comparison of the pressure threshold value to the pressure of the lubricant.

11. The transmission control system of claim 8, wherein the lubricant pressure sensor is configured to provide lubricant pressure sensor self-diagnostics that indicate a fault state, and the processor is configured to output the one or more control signals to command the transmission to the one clutch neutral state based on the lubricant pressure sensor in the fault state.

12. The transmission control system of claim 8, further comprising a brake pedal position sensor configured to observe a position of a brake pedal associated with the vehicle, and the processor is configured to determine whether the brake pedal is depressed prior to the determination of the pressure threshold value for the lubricant.

13. The transmission control system of claim 8, further comprising a vehicle speed sensor configured to observe a speed of the vehicle and the processor is configured to determine whether the speed of the vehicle exceeds a speed threshold prior to the determination of the pressure threshold value for the lubricant.

14. The transmission control system of claim 8, wherein the lubricant temperature sensor is configured to provide lubricant temperature sensor self-diagnostics that indicate a fault state of the lubricant temperature sensor, and the processor is configured to set a default temperature for the temperature of the lubricant based on the lubricant temperature sensor in the fault state.

15. A vehicle comprising:
 an eight speed transmission having an input shaft and a plurality of clutches, the eight speed transmission configured such that a range selection requires engagement of three clutches of the plurality of clutches;
 a sensor system including a lubricant pressure sensor configured to observe a pressure of a lubricant associated with the eight speed transmission, a lubricant temperature sensor configured to observe a temperature of the lubricant and an input shaft speed sensor configured to observe a speed of the input shaft;
 a controller, having a processor configured to:
  determine a selection of a neutral range for the eight speed transmission;
  determine, based on the selection of the neutral range, a pressure threshold value for the lubricant based on the temperature of the lubricant and the speed of the input shaft;
  output one or more control signals to command the eight speed transmission to a one clutch neutral state in which one clutch of the plurality of clutches is engaged based on the pressure of the lubricant being greater than the pressure threshold value; and
  output one or more control signals to command the eight speed transmission to maintain a two clutch neutral state in which two clutches of the plurality of clutches are engaged based on the pressure of the lubricant being less than the pressure threshold value.

16. The vehicle of claim 15, wherein the lubricant pressure sensor is configured to provide lubricant pressure sensor self-diagnostics that indicate a fault state, and the processor is configured to output the one or more control signals to command the eight speed transmission to the one clutch neutral state based on the lubricant pressure sensor in the fault state.

17. The vehicle of claim 15, further comprising a brake pedal position sensor configured to observe a position of a brake pedal associated with the vehicle, and the processor is configured to determine whether the brake pedal is depressed prior to the determination of the pressure threshold value for the lubricant.

18. The vehicle of claim 15, further comprising a vehicle speed sensor configured to observe a speed of the vehicle and the processor is configured to determine whether the speed of the vehicle exceeds a speed threshold prior to the determination of the pressure threshold value for the lubricant.

19. The vehicle of claim 15, wherein the lubricant temperature sensor is configured to provide lubricant temperature sensor self-diagnostics that indicate a fault state of the lubricant temperature sensor, and the processor is configured to set a default temperature for the temperature of the lubricant based on the lubricant temperature sensor in the fault state.

* * * * *